(12) United States Patent
Mechler et al.

(10) Patent No.: US 11,468,188 B2
(45) Date of Patent: Oct. 11, 2022

(54) SMART DEPLOYAI DATA PIPELINE DIGITAL SIGNING AND ENCRYPTION

(71) Applicant: SmartDeployAI LLC, Southlake, TX (US)

(72) Inventors: Timo Mechler, Southlake, TX (US); Charles Adetiloye, Southlake, TX (US)

(73) Assignee: SMARTDEPLOYAI LLC, Southlake, TX (US)

( * ) Notice: Subject to any disclaimer, the term of this patent is extended or adjusted under 35 U.S.C. 154(b) by 93 days.

(21) Appl. No.: 16/848,974

(22) Filed: Apr. 15, 2020

(65) Prior Publication Data
US 2020/0327248 A1 Oct. 15, 2020

Related U.S. Application Data

(60) Provisional application No. 62/920,101, filed on Apr. 15, 2019.

(51) Int. Cl.
| | | |
|---|---|---|
| *G06F 21/62* | (2013.01) | |
| *G06F 21/79* | (2013.01) | |
| *H04L 9/32* | (2006.01) | |
| *H04L 9/16* | (2006.01) | |
| *H04L 9/06* | (2006.01) | |

(52) U.S. Cl.
CPC .......... *G06F 21/6227* (2013.01); *G06F 21/79* (2013.01); *H04L 9/0631* (2013.01); *H04L 9/16* (2013.01); *H04L 9/3247* (2013.01); *G06F 2221/2107* (2013.01)

(58) Field of Classification Search
CPC .. G06F 21/6227; G06F 21/79; G06F 21/6218; G06F 2221/2107; H04L 9/0631; H04L 9/16; H04L 9/3247; H04L 9/0866; H04L 9/321; H04L 9/3231; H04L 9/0894
See application file for complete search history.

(56) References Cited

U.S. PATENT DOCUMENTS

| | | | |
|---|---|---|---|
| 2007/0011437 A1* | 1/2007 | Carnahan | G06F 9/4494 712/200 |
| 2018/0240112 A1* | 8/2018 | Castinado | G06Q 20/381 |
| 2018/0336366 A1* | 11/2018 | Scheiblauer | H04L 9/16 |
| 2019/0081782 A1* | 3/2019 | Dewitt | G06F 21/78 |
| 2020/0004591 A1* | 1/2020 | Das | H04L 63/083 |
| 2020/0201831 A1* | 6/2020 | Shekhawat | G06F 8/71 |
| 2020/0301689 A1* | 9/2020 | Mechler | G06F 8/63 |
| 2020/0310394 A1* | 10/2020 | Wouhaybi | H04L 67/125 |
| 2021/0319436 A1* | 10/2021 | Ow | G06Q 20/38215 |

\* cited by examiner

*Primary Examiner* — Carl G Colin
*Assistant Examiner* — Han Yang
(74) *Attorney, Agent, or Firm* — Jonathan B. David (57) ABSTRACT

The present invention relates to a method for encrypting a data pipeline in a computer system. A device receives a request to encrypt a data pipeline. The device can also receive encrypted stages of a data pipeline that are encrypted by an encryption key. The device can generate random locations in storage where the data pipeline stages will be stored. The random locations can be generated in response to the data pipeline stages being encrypted. The random storage locations can be stored in a mapping file. The mapping file can be selected to store the random locations based on the random storage locations being generated. The device can encrypt the mapping file based on the mapping file storing the random storage locations. The device can place the encrypted mapping file in memory.

15 Claims, 8 Drawing Sheets

G. Pipeline Encryption Flow Diagram

A. Boilerplate Figure

Fig. 1

B. A Sample Data Pipeline

G. Pipeline Encryption Flow Diagram

Fig. 7

H. Pipeline Decryption Flow Diagram

Fig. 8

SMART DEPLOYAI DATA PIPELINE DIGITAL SIGNING AND ENCRYPTION

CROSS-REFERENCE TO RELATED APPLICATIONS

This application claims priority to U.S. Provisional Patent Application Ser. No. 62/920,101, filed Apr. 15, 2019, entitled "SMARTDEPLOYAI PIPELINE DIGITAL SIGNING & ENCRYPTION." The entire content of that application is incorporated herein by reference.

BACKGROUND

Field of the Art

Embodiments of the present invention described herein generally relate to encrypting and decrypting data pipelines in a cloud, hybrid or on-premise network computing system. The encryption and decryption processes are highly portable and not tied down to any specific configuration.

Discussion of the State of the Art

One of the challenges today is to consistently ensure the authenticity of software's author as it has become much easier to create, duplicate and quickly distribute software to many users around the world. Accordingly, the risk has increased for illegal or malicious copies of legitimate software that may enter circulation and also be widely distributed. Such consequences may include a malicious piece of software posing to originate from the original, legitimate author that may be accidentally installed on user's systems. As such, the user's system may be compromised, or one may illegally obtain access to proprietary, private or personal information. To minimize the risk of illegitimate software from being installed, many software authors or creators follow a process to digitally sing their code with encryption keys.

At a high level, code signing is based on public/private key cryptography. Generally, a software author will sign his or her software with a private key. The author itself only knows the private key. Potential software users then use a public key to check that the software was indeed created and signed by the original author(s). If this check passes, the user is assured that the software is authentic and that the software can be installed.

Data pipelines used in artificial intelligence and machine learning environments are unlike traditional software in that they may be deployed in different environments (cloud or on-premise, etc.), contain several stages which need to be correctly ordered, and may consist of a proprietary process. Without proper care, a data pipeline can be modified by a malicious third-party that can result in the release of non-public information, a proprietary process, or other sensitive or competitive information. Further, a data pipeline author may want to explicitly limit access to certain users as the author does not want the data pipeline to be used in the public domain. Accordingly, a need exists for the data pipeline to be encrypted so that only an authorized set of users has the ability to decrypt and deploy the data pipeline. The present invention describes various embodiments that enable only an authorized set of users to decrypt and deploy a previously encrypted data pipelines.

SUMMARY

The present invention overcomes the limitations described above by introducing a method and system for encrypting data pipelines with a two-tier encryption process. The method includes receiving by a device a request to encrypt a data pipeline. The request can include encrypting a plurality of stages of the data pipeline. The method may also include receiving, by the device, encrypted stages of the data pipeline. An encryption key can encrypt the data pipeline stages. The method can also include generating by the device random storage locations where the data pipeline stages will be stored. The random storage locations can be generated in response to the encrypted stages of the data pipeline. The method may further include storing by the device the random locations in a mapping file. The mapping file can be selected to store the random storage locations including based on the random storage locations being generated. The method may further include encrypting by the device the mapping file. The mapping file may be encrypted based on storing the random storage locations. The method may also comprise storing by the device the encrypted mapping file in memory.

The objectives of the invention are achieved by the embodiments of the present invention. The method can also include storing an original digital signature in the mapping file.

The method includes the device encrypting the mapping file with a different encryption key after the random storage locations are stored in the mapping file.

The method includes the device approving the stages of the data pipeline before the stages of the data pipeline are encrypted.

The stages of the data pipeline include at least one of a data transform stage, data storage stage, and a data modeling stage.

The method includes storing an original data signature for the data pipeline stages.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The present invention is for deploying data pipelines for use in AI and ML in a computing device or computing system.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments.

Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

Figure 1:
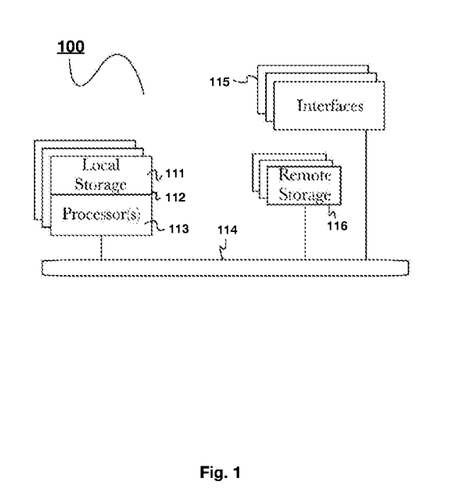
FIG. 1 illustrates an overview figure with respect to an embodiment of the present invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 100 includes one or more central processing units (CPU) 112, one or more interfaces 115, and one or more buses 114 (such as a peripheral component interconnect (PCI) bus). When acting under the control of appropriate software or firmware, CPU 112 may be responsible for implementing specific functions associated with the functions of a specifically configured computing device or machine. For example, in at least one aspect, a computing device 100 may be configured or designed to function as a server system utilizing CPU 112, local memory 111 and/or remote memory 116, and interface(s) 115. In at least one aspect, CPU 112 may be caused to perform one or more of the different types of functions and/or operations under the control of software modules or components, which for example, may include an operating system and any appropriate applications software, drivers, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 115 are provided as network interface cards (NICs). Generally, NICs control the sending and receiving of data packets over a computer network;

other types of interfaces 115 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 115 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the embodiments described herein, it is by no means the only device architecture on which at least a portion of the features and techniques described herein may be implemented. For example, architectures having one or any number of processors 113 may be used, and such processors 113 may be present in a single device or distributed among any number of devices. In one aspect, single processor 113 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote storage block 116 and local storage 111) configured to store data, program instructions for the general-purpose network operations, or other information relating to the functionality of the embodiments described herein (or any combinations of the above). Program instructions may control execution of or comprise an operating system and/or one or more applications, for example. Memory 116 or memories 111, 116 may also be configured to store data structures, configuration data, encryption data, historical system operations information, or any other specific or generic non-program information described herein.

Figure 2:
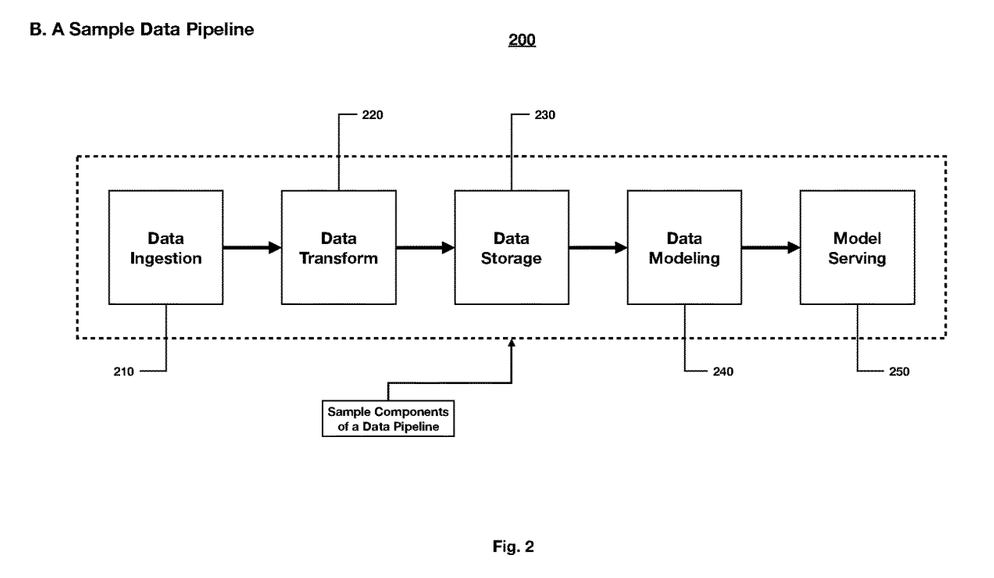
FIG. 2 illustrates a block diagram of an aspect of the present invention.

Referring to FIG. 2, a data pipeline 200 is illustrated. A user may configure the data pipeline 200 to include various pipeline stages. Moreover, a plurality of users or a single user can put together the data pipeline 200 with the various stages illustrated, or variations iterations of the stages of the data pipeline 200. The data pipeline 200 includes stages of data ingestion 210, data transform 220, data storage 230, data modeling 240 and model serving 250. In other embodiments, the data pipeline 200 may also include additional stages than what is shown in FIG. 2. The methods of encryption and decryption described below will show methods of providing security to prevent unauthorized users from gaining access to the one or more stages of the data pipeline 200.

Figure 3:
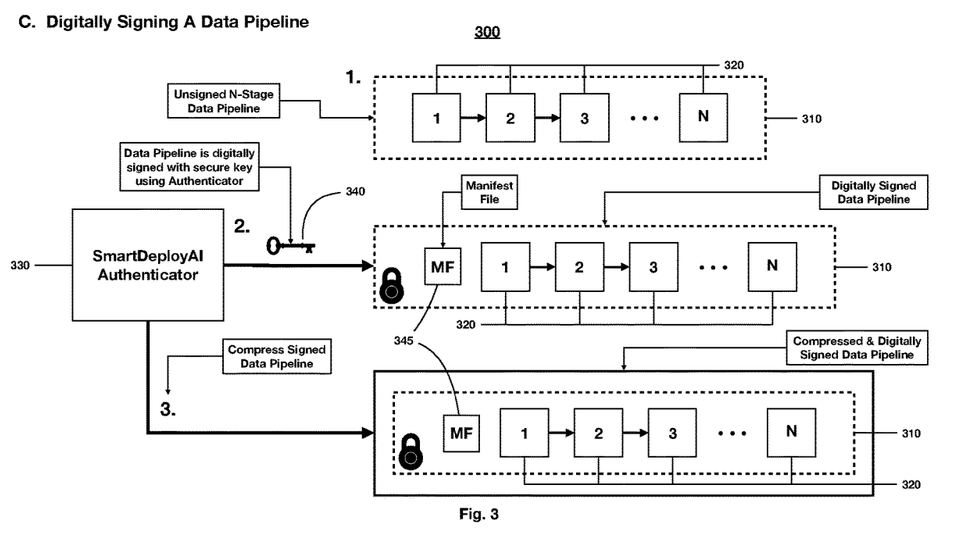
FIG. 3 illustrates another diagram of an aspect of the present invention.

In FIG. 3, a digital signature and authentication of the data pipeline in a computing system 300 is illustrated. The data pipeline 310 can be assembled and not be digitally signed. The data pipeline 310 can have unsigned N-Stages 320. In order to deploy and or run the data pipeline 310, the data pipeline needs to have a digital signature. A SmartDeployAI Authenticator 330 can use a secure key 340 to digitally sign the data pipeline 310. The secure key 340 can be an authenticator that unlocks the stages to the data pipeline. The signed data pipeline 310 with a manifest file 345 is illustrated as a result of the secure key 340 signing and authenticating the data pipeline 310. Upon receiving the digital signature, the data pipeline 310 can be deployed and executed. The SmartDeployAI Authenticator 330 may compress the signed data pipeline 310. The SmartDeployAI Authenticator 330 digitally signs the data pipeline 310 and enables the data pipeline 310 and its stages 320 to be put in use and/or be encrypted. Accordingly, the data pipeline 310 and its stages 320 can be executed and run.

Figure 4:
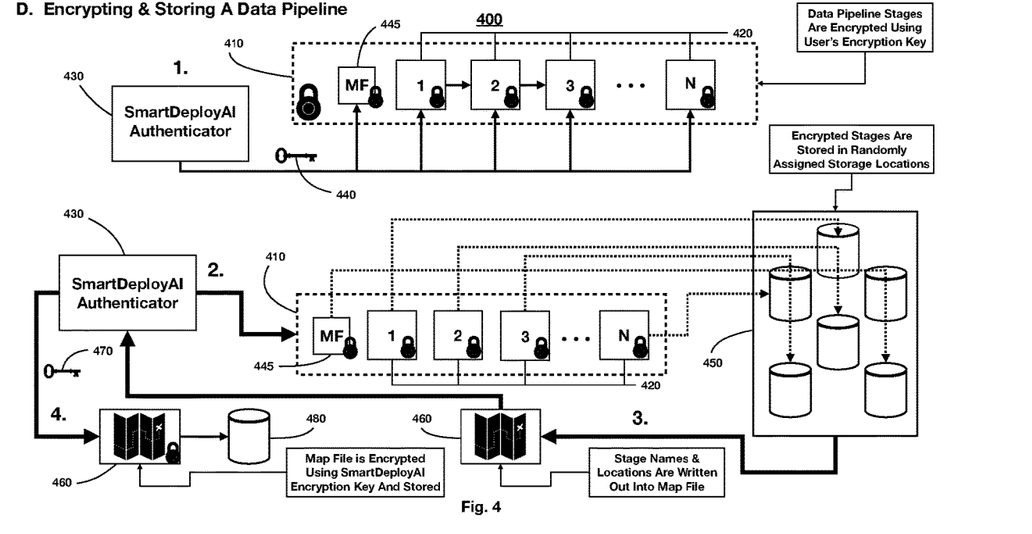
FIG. 4 illustrates a diagram with respect to an embodiment of the invention.

Referring to FIG. 4, within a computing system 400, a user may request to encrypt a data pipeline 410 with N stages 420. The user may make a request through a SmartDeployAI Authenticator 430 to encrypt the data pipeline 410, including the stages 420. The user's encryption key 440 can be used to encrypt the data pipeline 410. The encryption key 440 can lock the stages 420 including a manifest file (MF) 445. The data pipeline 410 being encrypted can enable random locations of storage 450 to be generated within the computing system 400. The random storage locations 450 can be generated, and the storage locations 450 can store the stages 420 of the data pipeline 410. The storage locations 450 along with any pipeline metadata and assembly instructions and MF 445 can be entered within a map file 460. The pipeline metadata and assembly instructions can be stored within the map file 460 along with the stages 420 so that the data pipeline 410 can be reconstructed again in the proper order when the data pipeline 410 is decrypted. The assembly instructions can be utilized to reassemble the stages 420 in the original order when the data pipeline 410 is decrypted.

The SmartDeployAI Authenticator 430 can encrypt the map file 460 containing the storage locations 450, pipeline metadata and assembly instructions using its own encryption key 470. The encryption key 470 can be used to encrypt the map file 460 containing the storage locations 450, pipeline metadata, and assembly instructions. The encryption key 470 can provide a second encryption in addition to the user's encryption key 440. The encryption key 470 encrypting the map file 460 can allow the map file 460 to be stored within a vault/storage facility 480. The map file 460 may remain in the vault 480 until the user decides to have access to the map file 460 at another interval or time.

Figure 5:
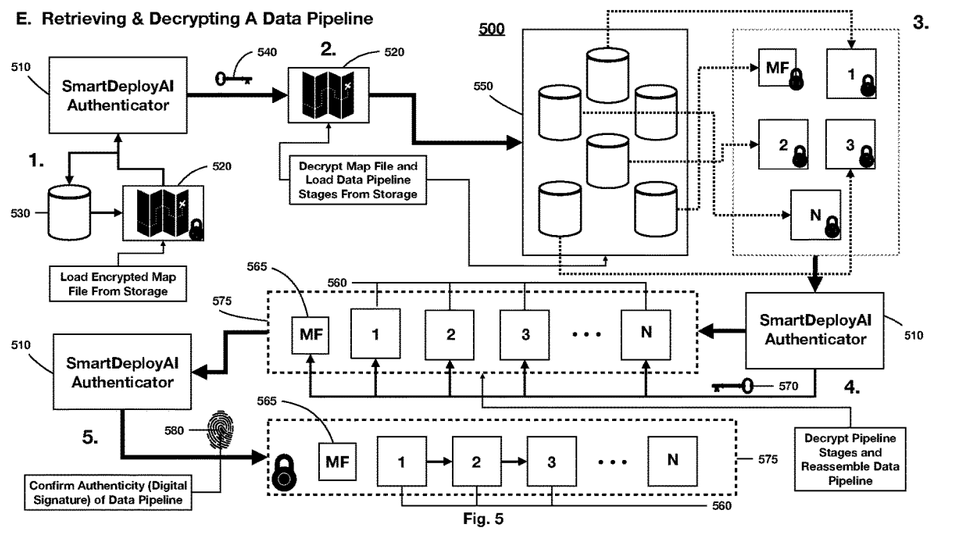
FIG. 5 illustrates a further diagram of an embodiment of the invention.

FIG. 5 illustrates a decryption process for a data pipeline within a computing system 500. A user may decide to gain access to one or data pipelines that may be encrypted and stored in a map file containing random storage locations. The user may decide to accordingly begin the decryption process to gain access to an encrypted data pipeline.

The decryption process begins when the SmartDeployAI Authenticator 510 receives a request from a user to decrypt a data pipeline from a map file 520. In response to the user request, the SmartDeployAI Authenticator 510 retrieves the map file 520 from a storage vault 530. The storage vault 530 can be used to store the map file 520. The map file 520 may contain storage locations 540 along with pipeline metadata and assembly instructions. A manifest file 545 may also be entered within the map file 520. The SmartDeployAI Authenticator 510 can pull the map file 520 out of the storage vault 530. The SmartDeployAI authenticator 510 can also decrypt the map file 520. The SmartDeployAI Authenticator 510 can use an authentication key 540 to decrypt the map file 520 and reveal the locations 550 of the stages 560 of the data pipeline. The SmartDeployAI Authenticator 510 may also look up the encrypted stages 560, and load the stages 560 from storage. The user/customer's encryption key 570 can be used to decrypt the stages 560. The encryption key 570 can decrypt the stages 560 and enable the stages 560 to be reassembled in its original order in the data pipeline 575. Assembly instructions which were stored within the map file 520 may also be used to enable the stages 560 of the data pipeline 575 to be reassembled. The stages 560 may be reassembled in its original order before the stages 560 were encrypted.

The SmartDeployAI Authenticator 520 can also digitally sign 580 the data pipeline 575. The digital signature 580 is compared with an original digital signature (explained above in FIG. 4) that was given when the data pipeline 575 was originally approved. The digital signature 580 is compared with the original signature to ensure that both signatures match, ensure authenticity of the data pipeline 575, and to enable the data pipeline 575 to available for use. The signatures matching can confirm the authenticity of the data pipeline 575 and enable the data pipeline 575 to be available for use as a result. If both signatures do not match, the authenticity of the data pipeline 575 cannot be confirmed, and the user may accordingly issue a request to the SmartDeployAI Authenticator 520 to decrypt another encrypted data pipeline in storage.

Figure 6:
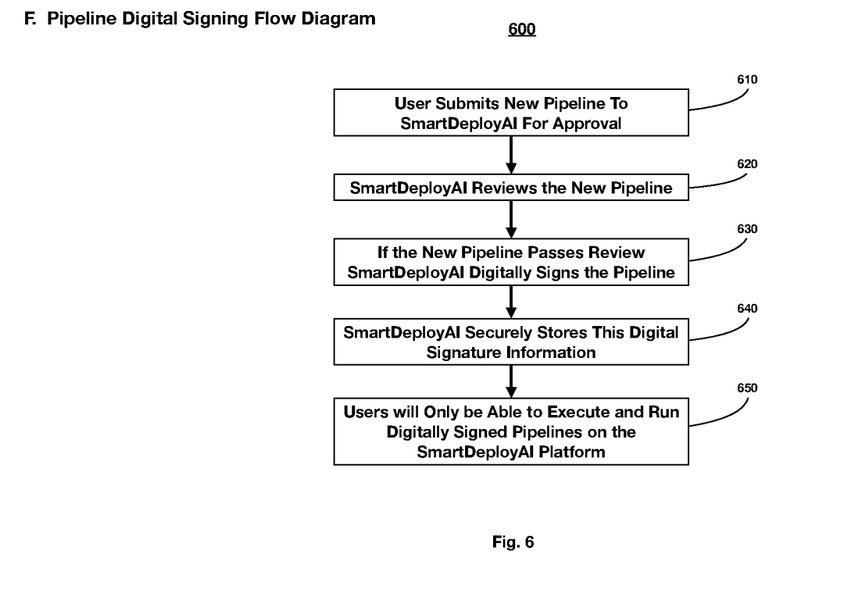
FIG. 6 illustrates a flowchart according to a preferred embodiment of the invention.

FIG. 6 illustrates a method 600 wherein the SmartDeployAI Authenticator approves and digital signs the data pipeline which the user has submitted for approval. At Step 610, the user submits a new data pipeline to the SmartDeployAI Authenticator for approval. The data pipeline can include a plurality of stages substantially similar to the data pipeline described in FIG. 2. At Step 620, the SmartDeployAI Authenticator Reviews the new data pipeline for approval. The SmartDeployAI Authenticator can analyze and review the stages for the assembled data pipeline to determine whether or not to approve the data pipeline. The SmartDeployAI Authenticator can decide whether to approve the data pipeline based on its analysis of the data pipeline. At Step 630, The SmartDeployAI Authenticator digitally signs the data pipeline based on its review of the data pipeline, and its approval of the data pipeline. In other embodiments, the SmartDeployAI Authenticator may decide to not approve a proposed data pipeline.

At step, 640, the SmartDeployAI Authenticator securely stores the digital signing information. The SmartDeployAI Authenticator stores the digital signing information to ensure authentication of the data pipeline. In an embodiment, the storing of the digital signing information is used to provide a matching signature to another signature which the SmartDeployAI Authenticator provides to the same data pipeline when it is reassembled after a decryption process. The stored digital signing information that matches the digital signature ensures the authenticity of the data pipeline. At Step 650, user/customers can execute and run the digitally signed pipeline. The user may only run and execute the data pipeline which the SmartDeployAI Authenticator has approved. If the SmartDeployAI Authenticator has not approved the data pipeline, the user cannot run or execute the data pipeline, and can only submit another data pipeline for approval.

Figure 7:
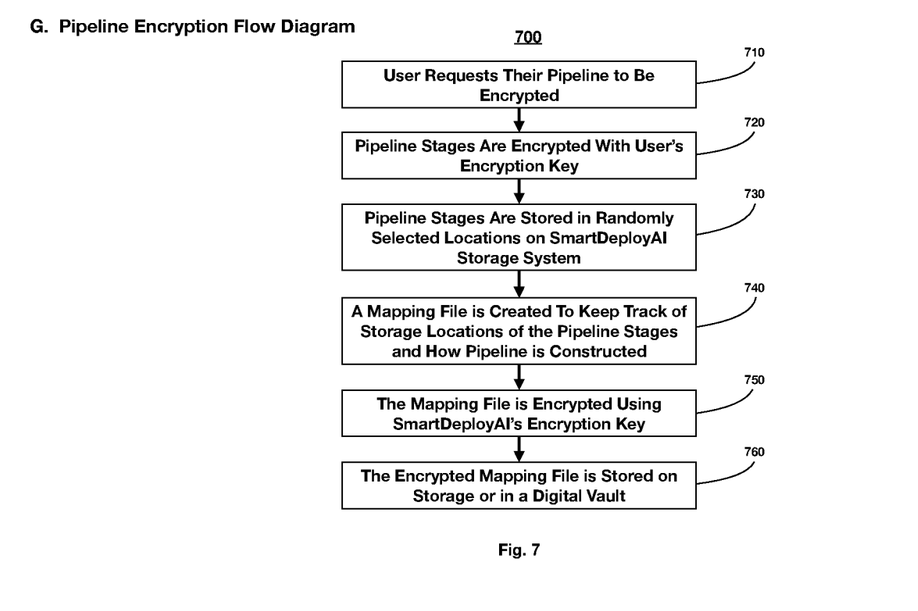
FIG. 7 illustrates a flowchart with respect to an embodiment of the invention.

FIG. 7 illustrates a method 700 for encrypting a data pipeline. The data pipeline can be substantially similar to that descripted above in FIGS. 2-4. After a user has been able to have the SmartDeployAI Authenticator approve and digitally sign a data pipeline, a user may decide to encrypt the approved data pipeline, and have the encrypted data pipeline placed in storage.

At step 710, the user can request for the data pipeline to be encrypted. The user can desire to run or execute the data pipeline at a later time, and decide to encrypt the data pipeline as a result. At step 720, the user encrypts the data pipeline, including a plurality of stages of the data pipeline, using the user's encryption key. The user's encryption key encrypts the data pipeline and prevents the data pipeline from being run or executed. At step 730, the pipeline stages are stored in randomly selected locations on the SmartDeployAI storage system. The SmartDeployAI can generate random storage locations in response to the user encrypting the data pipeline. The random storage locations are generated to store the encrypted data pipeline. At step 740, a mapping file is created to keep track and store the random storage locations. The SmartDeployAI creates the mapping file in response to generating the random storage locations. The mapping file can be created to store the storage locations, pipeline metadata, and assembly instructions to reconstruct the stages to the data pipeline containing the data pipeline stages. The assembly instructions can enable the stages of the data pipeline to be reassembled in the same order when the mapping file is decrypted at a later time.

At step 750, the mapping file is encrypted using the SmartDeployAI encryption key. The SmartDeployAI encryption key can encrypt the mapping file including the storage locations, pipeline metadata, and assembly instructions as a second-tier encryption. At step 760, the SmartDeployAI stores the encrypted mapping file in storage within a digital vault. The encrypted mapping file will remain in the digital vault unless the user requests a decryption procedure to access the mapping file.

Figure 8:
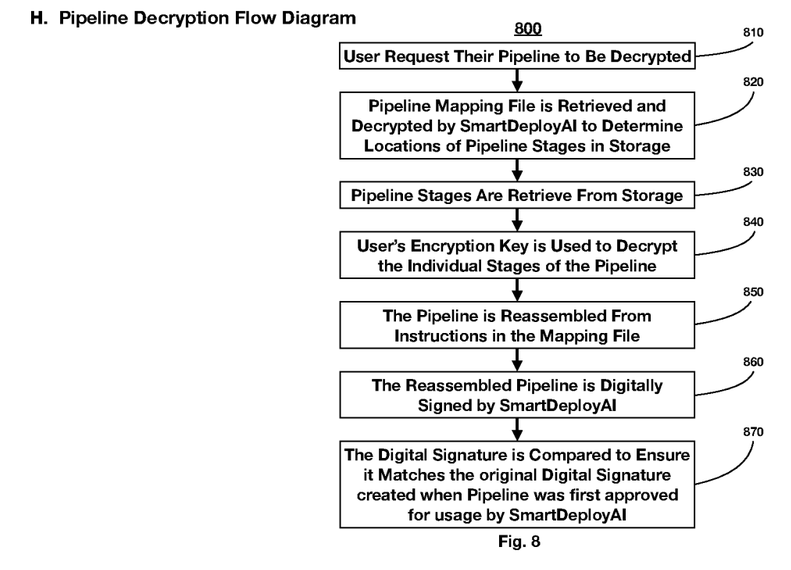
FIG. 8 illustrates another flowchart with respect to an embodiment of the invention.

FIG. 8 illustrates a method 800 for decrypting a data pipeline. A user may wish to access a mapping file substantially similar to what is described in the figures above. The decryption process must be completed for the user to be able access the map file.

At step 810, the user sends the SmartDeployAI a request to decrypt their data pipeline. The user may see which of their data pipelines are currently encrypted through a web user interface. They can make a request through the web user interface to decrypt and load a particular data pipeline. Random storage locations are stored in the mapping file along with any pipeline metadata and assembly instructions to reconstruct the stages to a data pipeline. The random storage locations are used to look up and load the stages of the data pipeline to reconstruct the data pipeline. At step 820, the mapping file is retrieved and decrypted by the SmartDeployAI to determine the random storage locations. Upon receiving the user request for decryption, the SmartDeployAI retrieves the encrypted mapping file to locate the stages of the data pipeline. At step 830, the data pipeline stages are retrieved from storage. The SmartDeployAI retrieves the stages of the data pipeline after determining the storage locations of the stages of the data pipeline. At step 840, the user's encryption key decrypts the individual stages of the data pipeline. During the two-stage decryption process, the user uses the user encryption key to decrypt the stages of the data pipeline so that the pipeline stages can be loaded for reassembly. The assembly instructions may be used to reassemble the pipeline stages. SmartDeployAI's key can be used to unlock the mapping file to reveal the locations of the pipeline stages.

At step 850, the data pipeline is reassembled from the assembly instructions in the mapping file. The data pipeline can be originally encrypted with assembly instructions that indicate the order in which the stages of the data pipeline can be reassembled when the data pipeline is later decrypted. The assembly instructions are utilized to reassemble the stages to the data pipeline in their original order. At step 860, the reassembled data pipeline is digitally signed by the SmartDeployAI. The SmartDeployAI signs the reassembled data pipeline to authenticate the data pipeline. At step 870, the digital signature is compared with an original digital signature created when the data pipeline was originally approved. The digital signature is compared with the original digital signature to confirm the authenticity of the data pipeline. If the digital signature matches with the original digital signature, the authenticity of the data pipeline is confirmed, In contrast, if the digital signature does not match with the original digital signature, the authenticity of the data pipeline cannot be confirmed, and the user may request to decrypt another data pipeline that may be in storage.

Accordingly, the dual-encryption and dual-decryption processes described above may have several advantages. Three items are required when attempting to use the data pipeline described above. The customer's encryption key which encrypts and decrypts the pipeline stages must be obtained. In addition, SmartDeployAI's encryption key that encrypts and decrypts the mapping/manifest file is required. Further, knowledge of the data pipeline's digital signature which was issued when the SmartDeployAI approved the data pipeline to run on the platform is also required.

In an embodiment, for instance, if an unauthorized user (bad actor) were for some reason to obtain the customer's encryption key, the unauthorized party would at best have the ability to decrypt and reveal the pipeline stages. The unauthorized party would not know where to locate the pipeline stages on the SmartDeployAI file system because the unauthorized party would need the mapping/manifest file in order to locate pipeline stages.

In another embodiment, for instance, if an unauthorized user were to obtain the mapping/manifest file, and was able to decrypt the mapping file and reveal the locations of the pipeline stages, the unauthorized user would only know the location(s) of the pipeline stages and how the stages are constructed from end to end. The unauthorized user still would not actually be able to use the pipeline stages since the pipeline stages are encrypted using an encryption key belonging to the customer/authorized user. Therefore, without obtaining the customer's encryption key, the SmartDeployAI encryption key, and without knowledge of the digital signature that was issued when the SmartDeployAI first approved the data pipeline, an unauthorized user (bad actor) would not be able to use the data pipeline described in any of the embodiments above.

Exemplary user devices are illustrated in some of the figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

While exemplary embodiments are described herein, it is not intended that these embodiments describe all possible forms of the invention. Rather, the words used in the specification are words of description rather than limitation, and it is understood that various changes may be made without departing from the scope of the invention. Additionally, the features of various implementing embodiments may be combined to form further embodiments of the invention.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "SSD" storage drives that may combine physical components of solid state and hard disk drives in a single hardware device (as are becoming increasingly common in the art with regard to personal computers), storage memory, random access memory (RAM), and the like.

It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed:

1. A method comprising:
receiving by a device a request to encrypt a data pipeline, the request to encrypt a plurality of stages of the data pipeline, wherein the plurality of stages of the data pipeline are encrypted based on the request to encrypt the plurality of stages of the data pipeline at an initial system location;
receiving by the device encrypted stages of the pipeline, the stages being encrypted by an encryption key provided to the device;
generating by the device random locations in storage where the pipeline stages will be stored, wherein the random storage locations are generated in response to the encrypted stages of the data pipeline, wherein the random storage locations are not linked to the encrypted pipeline stages, wherein the data pipeline encryption enables the random storage locations in an external system to be generated, wherein the random storage locations in the external system are not available until after the data pipeline is encrypted, and wherein the encrypted pipeline stages are migrated from their initial system location to the generated random storage locations;

storing by the device the random storage locations in a mapping file, the mapping file selected to store the random storage locations based on the random storage locations being generated, wherein the mapping file is not linked to the generated random storage locations, and wherein the generated random storage locations with the encrypted pipeline stages are migrated from their initial system location to the mapping file;

encrypting by the device the mapping file, the mapping file being encrypted based on storing the random storage locations;

storing by the device the encrypted mapping file in memory; and retrieving the mapping file and using an decryption key to decrypt the data pipeline stages, wherein the data pipeline is reassembled from the decrypted stages and digitally signed, wherein the digital signature is compared to an original digital signature to validate an authenticity of the reassembled data pipeline.

2. The method of claim 1, further comprising: storing the original digital signature in the mapping file or a separate storage location.

3. The method of claim 1, wherein an external source provides the encryption key to encrypt the stages of the data pipeline.

4. The method of claim 1, further comprising:
the device encrypting the mapping file with a different encryption key after the random storage locations are stored in the mapping file.

5. The method of claim 1, further comprising:
the device approving the stages of the data pipeline before the stages of the data pipeline are encrypted.

6. The method of claim 1, further comprising: tracking the digital signature of the data pipeline after the device approves the stages of the data pipeline.

7. The method of claim 1, wherein the stages of the data pipeline include at least one of a data transform stage, data storage stage and a data modeling stage.

8. The method of claim 1, further comprising: storing the original digital signature for the data pipeline stages, the original digital signature being stored within a separate storage location.

9. The method of claim 1, further comprising:
receiving a request by the device to decrypt the data pipeline, the request including a request to decrypt the stages of the data pipeline;
searching by the device for locations of the stages of the data pipeline, the search based on the request to decrypt the data pipeline;
locating the stages to the data pipeline by the device as a result of the search for the locations of the stages to the data pipeline;
receiving by the device an authentication key to unlock the stages of the data pipeline, the authentication key being received as a result of the stages of the data pipeline being located; and
reassembling the date pipeline by the device based on the authentication key unlocking the stages of the data pipeline.

10. The method of claim 9, further comprising: resigning the data pipeline by the device after the data pipeline has been reassembled.

11. The method of claim 9, further comprising: allowing the data pipeline to be used for additional applications, the data pipeline being available based on the data pipeline being reassembled.

12. A network computer system comprising:
one or more processors:
a set of memory resources to store a set of instructions that, when executed by the one or more processors, cause the one or more processors to:
receive a request to encrypt a data pipeline, the data pipeline including a data transform, data storage, and a data modeling stage;
encrypt the data transform, data storage, and data modeling stages, the stages of the data pipeline encrypted based on receipt of the request to encrypt the data pipeline at an initial system location;
generate random storage locations to store the stages of the data pipeline, the random storage locations generated based on the stages of data pipeline stages being encrypted, wherein the random storage locations are not linked to the encrypted pipeline stages, wherein the data pipeline encryption enables the random storage locations in an external system to be generated, wherein the random storage locations in the external system are not available until after the data pipeline is encrypted, and wherein the encrypted pipeline stages are migrated from their initial system location to the generated random storage locations;
store the random storage locations in a mapping file, the mapping file selected to store the random storage locations based on the random storage locations being generated, wherein the mapping file is not linked to the generated random storage locations, and wherein the generated random storage locations with the encrypted pipeline stages are migrated from their initial system location to the mapping file;
encrypt the mapping file storing the random storage locations, the mapping file being encrypted as a result of receiving the random storage locations;
store the encrypted mapping file including the random storage locations; and
retrieve the mapping file and use an decryption key to decrypt the data pipeline stages, wherein the data pipeline is reassembled from the decrypted stages and digitally signed, wherein the digital signature is compared to an original digital signature to validate an authenticity of the reassembled data pipeline.

13. The system of claim 12, wherein the data transform, data storage and data modeling stages of the data pipeline are approved before the request to encrypt the data pipeline is received.

14. The system of claim 12, wherein the encrypted mapping file is stored in a vault.

15. The system of claim 12, wherein assembly instructions for the stages of the data pipeline are stored within the mapping file.

* * * * *